(12) United States Patent
Simon et al.

(10) Patent No.: US 7,802,618 B2
(45) Date of Patent: Sep. 28, 2010

(54) THERMOSTAT OPERATION METHOD AND APPARATUS

(75) Inventors: Timothy M. Simon, San Francisco, CA (US); Blaine M. Smith, Portland, OR (US); Matthew T. Fisher, Reno, NV (US)

(73) Assignee: Tim Simon, Inc., San Francisco, CA (US)

( * ) Notice: Subject to any disclaimer, the term of this patent is extended or adjusted under 35 U.S.C. 154(b) by 1245 days.

(21) Appl. No.: 11/335,182

(22) Filed: Jan. 19, 2006

(65) Prior Publication Data

US 2006/0186214 A1 Aug. 24, 2006

Related U.S. Application Data

(60) Provisional application No. 60/645,083, filed on Jan. 19, 2005, provisional application No. 60/664,561, filed on Mar. 23, 2005.

(51) Int. Cl.
F25B 29/00 (2006.01)
G05D 23/00 (2006.01)

(52) U.S. Cl. ............. 165/254; 236/46 R; 236/1 C (58) Field of Classification Search ........... 236/1 C, 236/46 C, 51; 165/237, 254
See application file for complete search history.

(56) References Cited

U.S. PATENT DOCUMENTS

| | | | | |
|---|---|---|---|---|
| 2,024,385 A | * | 12/1935 | Persons | 165/259 |
| 2,801,825 A | * | 8/1957 | Bishofberger | 165/256 |
| 3,284,002 A | | 11/1966 | Edelamn et al. | |
| 3,599,710 A | | 8/1971 | Joslin | |
| 4,060,123 A | | 11/1977 | Hoffman et al. | |
| 4,215,408 A | * | 7/1980 | Games et al. | 700/278 |
| 4,223,831 A | | 9/1980 | Szarka | |
| 4,294,404 A | | 10/1981 | Gajjar | |
| 4,318,508 A | | 3/1982 | Glasgow et al. | |
| 4,323,112 A | * | 4/1982 | Nordeen | 165/255 |
| 4,386,649 A | | 6/1983 | Hines et al. | |

(Continued)

FOREIGN PATENT DOCUMENTS

DE 334117 A1 4/1985

(Continued)

OTHER PUBLICATIONS

Office Action mailed Sep. 25, 2008 for U.S. Appl. No. 11/325,746, filed Jan. 5, 2006; 11 pgs.

*Primary Examiner*—Frantz F. Jules
*Assistant Examiner*—Alexis K Cox
(74) *Attorney, Agent, or Firm*—James F. Hann; Haynes Boone & Wolfeld LLP (57) ABSTRACT

A thermostat may be placed in a heating mode when the sensed temperature is less than the lowest of the heating and cooling target temperatures by a first amount and may be placed in a cooling mode when the sensed temperature is greater than the highest of the heating and cooling target temperatures by a second amount. The presence or absence of a user may be monitored. If the thermostat is in a user absent mode, a cool setback amount may be added to the cooling target temperature and a heat setback amount may be subtracted from the heating target temperature to arrive at setback cooling and setback heating target temperatures, respectively. The thermostat may comprise a touch-sensitive screen having various display areas.

6 Claims, 7 Drawing Sheets

U.S. PATENT DOCUMENTS

| | | | |
|---|---|---|---|
| 4,410,131 A * | 10/1983 | Radtke et al. | 236/10 |
| 4,433,809 A | 2/1984 | Schulz | |
| 4,446,913 A | 5/1984 | Krocker | |
| 4,485,864 A | 12/1984 | Carrell et al. | |
| 4,524,908 A * | 6/1985 | Marshall et al. | 236/46 R |
| 4,594,881 A * | 6/1986 | Imamura | 73/37.5 |
| 4,623,969 A | 11/1986 | Bensoussan et al. | |
| 4,632,303 A | 12/1986 | Rodittis | |
| 4,635,708 A | 1/1987 | Levine | |
| 4,646,964 A | 3/1987 | Parker et al. | |
| 4,683,939 A | 8/1987 | Levine | |
| 4,687,050 A * | 8/1987 | Podlipnik | 165/255 |
| 4,733,719 A | 3/1988 | Levine | |
| 4,841,738 A * | 6/1989 | Katsuki et al. | 62/160 |
| 4,889,179 A | 12/1989 | Merenda | |
| 4,914,568 A | 4/1990 | Kodosky et al. | |
| 5,285,961 A | 2/1994 | Rodriquez, Jr. | |
| 5,318,224 A | 6/1994 | Darby et al. | |
| 5,620,137 A | 4/1997 | Coelho et al. | |
| 5,782,296 A | 7/1998 | Mehta | |
| 5,785,243 A | 7/1998 | Cross | |
| 5,819,840 A | 10/1998 | Wilson et al. | |
| 5,937,942 A | 8/1999 | Bias et al. | |
| 5,957,374 A | 9/1999 | Bias et al. | |
| 6,020,881 A | 2/2000 | Naughton et al. | |
| 6,164,374 A | 12/2000 | Rhodes et al. | |
| 6,259,074 B1 | 7/2001 | Brunner et al. | |
| 6,581,846 B1 | 6/2003 | Rosen | |
| 6,595,430 B1 | 7/2003 | Shah | |
| 6,619,555 B2 | 9/2003 | Rosen | |
| 6,786,421 B2 | 9/2004 | Rosen | |
| 6,789,739 B2 | 9/2004 | Rosen | |
| 6,824,069 B2 | 11/2004 | Rosen | |
| 2004/0182941 A1 | 9/2004 | Alles | |
| 2006/0030954 A1 | 2/2006 | Bergman et al. | |
| 2006/0097063 A1 | 5/2006 | Zeevi | |

FOREIGN PATENT DOCUMENTS

| | | |
|---|---|---|
| DE | 296 00 654 U1 | 4/1996 |
| EP | 0 434 926 A2 | 7/1991 |
| EP | 0 985 994 A1 | 3/2000 |
| WO | WO 97/39392 | 10/1997 |

* cited by examiner

THERMOSTAT OPERATION METHOD AND APPARATUS

CROSS-REFERENCE TO RELATED APPLICATIONS

This patent application claims the benefit of provisional patent application No. 60/645,083, filed 19 Jan. 2005, entitled Thermostat With Touch-Screen Display, and provisional patent application No. 60/664,561, filed 23 Mar. 2005, entitled Water Timer and Method.

This application is related to U.S. application Ser. No. 11/335,155, TIMS 1007-3), titled Multiple Thermostat Installation, filed on 19 Jan. 2006.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The present invention relates generally to thermostats used for heating and cooling systems, such as gas or electric forced air furnaces, gas or electric radiant heating furnaces, electric forced air air-conditioning systems, and electric heat pumps. Invention may also be suitable for other types of systems, including solar and solar electric heating and cooling systems.

Digital set-back programmable thermostats typically use a screen, such as a liquid-crystal display (LCD), to display both operational functions and programming values. The user enters commands into the thermostat, such as for setting the current time and date and programming the thermostat, by pressing keys or pressing appropriate positions on a touch screen display. In many cases a set of instructions explaining the steps that must be taken to operate the thermostat is printed on the thermostat or separately documented so that programming such a thermostat can be quite confusing and tedious. Also, programming conventional thermostats is typically accomplished only after selecting a series of different screens on the display. In addition, information relating to the status of the thermostat and the settings in the program controlling the thermostat is often accessible only by reviewing different screens on the display.

Many thermostats are used to control both a furnace in the heating mode and an air-conditioning unit in the cooling mode. The heating and cooling modes are typically controlled manually. That is, the user sets the thermostat to either cool or heat so that only the furnace or only the air-conditioning unit is operational in the chosen mode.

Many programmable thermostats have only heating, off, and cooling modes. Programmable thermostats that have an automatic setting, sometimes referred to as auto thermostats, typically have heating, auto, cooling, and off modes. In both cases, the user can put in separate setting times and temperatures from a heating program and a cooling program. Auto thermostats automatically switch between the user's heating and cooling programs as a function of room temperature.

There are typically two limitations associated with conventional auto thermostats. One limitation is that heating and cooling program times must be the same; that is, the times for each period (typically morning, day, evening, and night) must be the same. The other limitation is that the user's cooling program target temperature can never be closer than X degrees (typically 3° F.) to the user's heating program target temperature. So if the user sets the heating target temperature to 70, the cooling target temperature cannot be set any closer than 73 in this example. When the user tries to lower the cooling target temperature below 73, the programming of the thermostat typically just stops and frustrates the user. Likewise, if the user wants to raise the heat setting, for example changing the heating target temperature from 70 to 72, the higher temperature may be too close to the cooling target temperature so that the programming of the thermostat may also stop.

Although programmable thermostats hold out the promise of reducing the energy used by heating systems, the U.S. Environmental Protection Agency, which provides the ENERGY STAR certification for appliances and other devices, has expressed concern that potential energy savings are not being realized because of the difficulties consumers face trying to program conventional digital thermostats.

BRIEF SUMMARY OF THE INVENTION

A first aspect of the invention is directed to a method for automatically switching between heating and cooling modes of a thermostat, comprising: setting a heating target temperature; setting a cooling target temperature; sensing the temperature within a conditioned region; placing the thermostat in a heating mode when the sensed temperature is less than the lowest of the heating and cooling target temperatures by a first amount; and placing the thermostat in a cooling mode when the sensed temperature is greater than the highest of the heating and cooling target temperatures by a second amount.

A second aspect of the invention is directed to a method for automatically switching between heating and cooling modes of a thermostat, comprising: setting a heating target temperature; setting a cooling target temperature; sensing the temperature within a conditioned region; determining the apparent presence or absence of a user; and placing the thermostat in a user present mode or a user absent mode based upon the result of the determining step. If the thermostat is in a user present mode, then: place the thermostat in a heating mode when the sensed temperature is less than the lowest of the heating and cooling target temperatures by a first amount; and place the thermostat in a cooling mode when the sensed temperature is greater than the highest of the heating and cooling target temperatures by a second amount. If the thermostat is in a user absent mode, then: add the cool setback amount to the cooling target temperature and subtract the heat setback amount from the heating target temperature to arrive at setback cooling and setback heating target temperatures, respectively. The thermostat is placed in a heating mode when the sensed temperature is less than the setback heating target temperature. The thermostat is placed in a cooling mode when the sensed temperature is greater than the setback cooling target temperature.

A third aspect of the invention is directed to a method for automatically switching between heating and cooling modes of a thermostat, the thermostat comprising a thermostat controller, the method comprising: setting a heating target temperature; setting a cooling target temperature; sensing the temperature within a conditioned region; and determining the apparent presence or absence of a user. The determining step is carried out using each of the following: sensing motion within a monitored region and providing an occupant present signal to the thermostat controller when motion above a threshold minimum level has been sensed; detecting air pressure changes and providing a change in occupancy signal to the controller when an air pressure change above a threshold minimum level has been sensed; and monitoring sound level and integrating the monitored sound level over time and providing an occupant present signal to the controller when sound above a threshold minimum integrated sound level has been sensed. The thermostat is placed in a user present mode or a user absent mode based upon any one of the motion sensing, air pressure detecting or sound level monitoring steps.

A fourth aspect of the invention is directed to a thermostat comprising: a user interface; a controller coupled to the user interface and configured to provide a target temperature signal to a heater/cooler; a temperature sensor operably coupled to the controller; and an occupant presence detector operably coupled to the controller to provide the controller with an occupant present/absent signal according to the perceived presence/absence of an occupant. The occupant presence detector comprises: a motion sensor constructed to provide an occupant present signal to the controller when motion above a threshold minimum level has been sensed; an air pressure change detector constructed to provide a change in occupancy signal to the controller when an air pressure change above a threshold minimum level has been sensed; and an integrating sound level sensor constructed to integrate sensed sound level over time and provide an occupant present signal to the controller when sound above a threshold minimum integrated sound level has been sensed.

A fifth aspect of the invention is directed to a touch-sensitive screen for a user interface for a thermostat comprising: first display areas for time of day set points; second display areas, corresponding to each of the first display areas, for occupant-present target temperatures; and third display areas, corresponding to each of the first display areas, for occupant-absent target temperatures.

A sixth aspect of the invention is directed to a thermostat comprising: a user interface; a controller coupled to the user interface and configured to provide a target temperature signal to a heater/cooler; a temperature sensor operably coupled to the controller. The controller comprises: time of day set points; occupant-present target temperatures for at least some of the time of day set points; and occupant-absent target temperatures for at least some of the time of day set points. The user interface comprises a display for displaying each of the time of day set points and the occupant-present and occupant-absent target temperatures associated therewith. An occupant presence detector is operably coupled to the controller to provide the controller with an occupant present/absent signal according to the perceived presence/absence of an occupant, whereby the target temperature signal depends on the target temperature corresponding to: (1) the time of day and (2) the present/absent signal.

A seventh aspect of the invention is directed to a user interface for a thermostat comprising: a touch-sensitive screen comprising a screen display with a plurality of screen areas. The screen areas comprise: a plurality of display areas for display of thermostat status information; and a plurality of touch-sensitive input areas for user input of thermostat inputs. All of the screen areas for thermostat status information and for thermostat inputs are single-function screen areas and are accessible on a single screen display.

An eighth aspect of the invention is directed to a thermostat comprising: a user interface; a controller coupled to the user interface and configured to provide a target temperature signal to a heater/cooler; and a temperature sensor operably coupled to the controller. The controller comprises: time of day set points; occupant-present target temperatures for at least some of the time of day set points; and occupant-absent target temperatures for at least some of the time of day set points. The user interface comprises a touch-sensitive screen, the touch-sensitive screen comprising: first display areas for displaying each of the time of day set points; second display areas, corresponding to each of the first display areas, for displaying each of the occupant-present target temperatures; and third display areas, corresponding to each of the first display areas, for displaying each of the occupant-absent target temperatures. All of the display areas are single-function display areas and are accessible on a single screen display. An occupant presence detector is operably coupled to the controller to provide the controller with an occupant present/absent signal according to the perceived presence/absence of an occupant, whereby the target temperature signal depends on the target temperature corresponding to: (1) the time of day and (2) the present/absent signal.

DETAILED DESCRIPTION OF THE INVENTION

The following description of the invention will typically be with reference to specific structural embodiments and methods. It is to be understood that there is no intention to limit the invention to the specifically disclosed embodiments but that the invention may be practiced using other features, elements, methods and embodiments.

Figure 1:
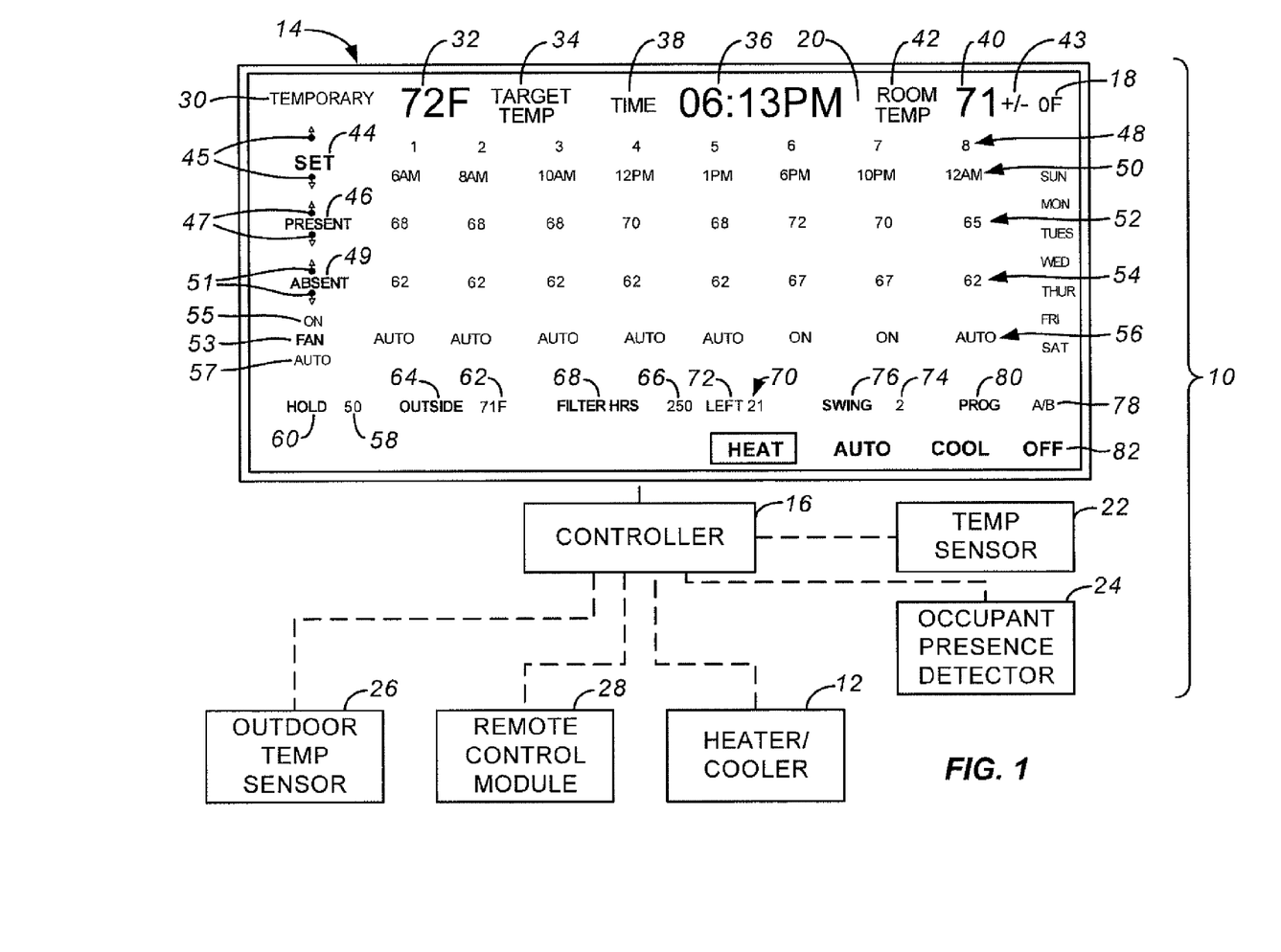
FIG. 1 is a schematic illustration of a thermostat made according to the invention connected to a heater/cooler, the thermostat including a user interface coupled to a controller.

FIG. 1 illustrates a thermostat 10 connected to a heater/cooler 12. Heater/cooler 12 can include a heating system, a cooling system, or both a heating and cooling system. Heater/cooler 12 typically includes both heating and cooling units. Thermostat 10 may be used with, for example, one or more of gas or electric forced air furnaces, gas or electric radiant heating furnaces, electric forced air air-conditioning systems, and electric heat pumps. The invention may also be suitable for solar or solar electric heating/cooling systems used instead of or in addition to conventional heating and/or cooling systems.

Thermostat 10 includes a user interface 14 coupled to a CPU or controller 16. User interface 14 includes a display 18 having a touch sensitive screen 20. Thermostat 10 also includes, in this embodiment, a temperature sensor 22 and an occupant presence detector 24, sometimes called a people sensor, connected to controller 16. Optionally thermostat 10 may be coupled to one or more temperature sensors 22, and outside temperature sensor 26 and a remote control module 28. The various components of thermostat 10 will now be discussed.

Touch sensitive screen 20 includes a number of display areas, a number of touch-sensitive input areas for the user input of information, and identifiers, typically words and/or symbols used to identify what is displayed in the associated display areas. Temporary identifier 30 is used when it is desired to override the target temperature with an override temperature for the particular heating or cooling period. The target temperature is returned to during the next heating or cooling period.

Current target temperature display area 32 displays the current target temperature for thermostat 10; display area 32 is identified by current target temperature identifier 34. The current time is displayed at current time display area 36 with this location identified by time identifier 38. The current temperature in the room or rooms or other area or areas being monitored is displayed at current temperature display area 40 next to current temperature identifier 42. If more than one room or area is being monitored for temperature, each temperature may be simultaneously displayed or displayed in an alternating or rotating fashion; also, the displayed temperature may be an average or median temperature median temperature as well.

In some situations that may be desirable to allow the user to reset or calibrate the temperature displayed at current temperature display area 40 so that the displayed temperature corresponds to, for example, a thermometer in the same room as thermostat 10. Calibration identifier 43 indicates when this calibration function has been activated. In FIG. 1 calibration identifier 43 indicates no calibration of the displayed temperature.

Below this upper row of display areas and identifier are four row-type display areas. The first is the time of day display area 48 for the user input of, in this embodiment, eight different times at which the temperature can be set as discussed below. Each time of day display area 48 is identified by a corresponding time of day identifier 50. Each time (displayed at its display area 48) associated with a time of day identifier 50 is set by first pressing on set identifier 44 and then using up and down set arrows 45 located above and below set identifier 44. Below display areas 48 are the occupant present temperature display areas 52 displaying the target temperature for the particular time of day when the presence of an occupant is sensed. Occupant presence detector 24 is operably coupled to controller 16 to provide the controller with an occupant present/absent signal according to the perceived presence/absence of an occupant. Occupancy in an area is presumed when there are two occupant present determinations in a five-minute period. The occupant present status will then typically be maintained for a period of one hour following the last determination of occupancy. The occupant present temperature for each occupant present temperature display area 52 is input by first pressing on present identifier 46 and then using up and down arrows 47 located above and below present identifier 46.

For example, in the disclosed embodiment of FIG. 1 the first, second and third occupant present target temperatures are all indicated to be 68° while the fourth occupant present target temperature display area 52 shows that the target temperature has been increased to 70°. In the example illustrated in FIG. 1, the target temperatures are for the heating mode. This indicates that from 6 a.m. through 10 a.m., the occupant present target temperature remains at 68°. The transition from 10 a.m. to 12 p.m. (noon) can be handled in at least two ways. The simplest would be at 12 noon the target temperature will increase from 68° to 70° in a stepwise fashion. Alternatively, the transition from 68° to 70° can be a more gradual transition (typically an incremental steps) over, for example, the entire two hours from 10 a.m. to 12 p.m. or, for example, from 11:30 a.m. to 12 p.m. The drop in temperature between, in this example, 6 p.m. and 10 p.m. may also be stepwise at 10 p.m. or a more gradual drop in temperature a starting sometime before 10 p.m.

The third occupant absent temperature display area 54 displays the target temperature corresponding to each time of day when controller 16 determines that an occupant is no longer present based upon the occupant present/absent signal from occupant presence detector 24. As will be discussed below, this is typically based upon the failure to detect the presence of an occupant for a predetermined period of time or upon sensing that the occupant has left the premises and has not returned for a period of time. The occupant absent temperature for each occupant absent temperature display area 54 is input by first pressing on absent identifier 49 and then using up and down arrows 51 located above and below absent identifier 49.

The target temperature displayed at display area 32 therefore depends on the target temperature corresponding to: (1) the time of day and (2) the present/absent signal.

Fan setting display area 56 is positioned directly below absent temperature display areas 54 and indicates whether the fan is to operate continuously during the chosen time period, the ON setting, or only when needed, the Auto setting. The status of the fan for each time of day identifier 50 is set by pressing fan identifier 53 and then pressing either on identifier 55 or auto identifier 57. In the disclosed embodiment of FIG. 1, the fan has been set to auto so to operate only upon demand, that is during an active heating and/or cooling cycle, from 12 a.m. (midnight) through 6 p.m. but has been set to on to operate continuously from 6 p.m. to midnight. Another fan setting, called the Auto+Circulate setting, may be provided in which the fan is operated during heating or cooling cycles, as in the Auto setting, and also is periodically operated for a set for length of time, such as 10 minutes each hour regardless of the heating or cooling requirements. The length of time may be preset or may be chosen by the user, typically from a series or range of times, such as 5, 10 or 15 minutes every hour. Therefore, under the Auto+Circulate setting, even if the target temperatures are set so that the heater/cooler 12 does not ever turn on, the fan will still be operated for a portion of each period of time, such as 10 minutes per hour, to keep air circulating.

The next row has a hold temperature display area 58 next to a hold temperature identifier 60. The hold temperature function is activated by pressing on hold identifier 60 and then using set arrows 45 to select the hold temperature. The hold temperature feature is typically used when the user is going to be absent for a period of time, such as while on vacation. When the hold temperature feature is active, thermostat 10 uses this relatively energy efficient temperature setting instead of the individual occupant present and occupant absent temperature settings. For example, in the winter a hold temperature may be 50° while in the summertime the hold temperature may be 85°.

Outside temperature display area 62 shows the current outdoor temperature as sensed by outdoor temperature sensor 26. Display area 62 is identified by outside temperature identifier 64. If outdoor temperature sensor 26 is used, the outdoor temperature will be displayed at outside temperature display area 62. When thermostat 10 is used with both a furnace and an air-conditioning unit, and when outdoor temperature sensor 26 is used, the outdoor temperature can be used to automatically switch between heating and cooling functions. For example, controller 16 can be programmed so that if the outdoor temperature is 71° or above, COOL settings take precedence and the air-conditioning unit is operated. If the outdoor temperature 70° or below, HEAT settings take precedence and the furnace is operated.

A total filter hours display area 66 is next to a total filter hours identifier 68. A remaining filter life display area 70 is used next to a remaining filter life identifier 72. The total filter life hours for the filter being used is input into display area 66 when the filter is replaced or cleaned by pressing filter hours identifier 68 and then using set arrows 45 to select the total filter hours, 250 in the example of FIG. 1. When the filter is cleaned or replaced, the filter hours and filter life display areas 66 and 70 will be the same. The estimated life of the filter is, in this embodiment, reduced according to the period of time the fan is operated. The remaining estimated life of the filter is displayed at remaining filter life display area 70 in a countdown fashion. Computing and displaying the estimated remaining filter life continuously and conspicuously provides the user with an immediate estimate of when the filter should be replaced or cleaned.

A temperature swing display area 74, located next to the temperature swing identifier 76, indicates the chosen temperature swing. In this embodiment a 2 degree temperature swing has been chosen so that at the present time, 6:13 p.m., the occupant present target temperature of 72° will cause the furnace to cycle on when the room temperature drops to 70° and thereafter to cycle off when the room temperature increases to 74°. Temperature swing values of 0.5°, 1°, 1.5°, 2°, 2.5° or 3° would be typical. In some embodiments the user can select the temperature swing; to do so the user presses temperature swing identifier 76 and then uses set arrows 45 to select the temperature swing. The positive and negative temperature swings need not be the same, such as a −2° temperature swing to turn on heat and a +1° to turn off heat.

Program chosen display area 78 is next to program chosen identifier 80 and indicates which of preset temperature programs have been selected. In one embodiment program A uses the EPA recommended temperatures for ENERGY STAR certification for the occupant present temperature settings. One of the advantages of the present invention is that additional energy savings can be achieved through the use of the occupant absent temperature settings when using program A. In this embodiment program B is preset to occupant present temperature settings of 70° and occupant absent temperature settings of 62°; the temperature settings are intended to be used as a starting point for the user to raise or lower them as appropriate for the different time periods. Additional and/or different temperature programs may also be provided.

Four different status display areas 82 are found along the lower edge of touch sensitive screen 20. When selected, the appropriate status word will come on or become prominent, such as by being illuminated, highlighted, underlined, blinking, boxed (as in FIG. 1) or otherwise. When selected, the mode word will come on (heat/cool etc).

Occupant Presence Detector Concept

Occupant presence detector 24 may include one or more detectors for sensing the presence or absence, or both, of an occupant in one or more rooms or other areas. For example, the occupant presence detector may include a passive infrared detector to sense movement of an occupant. If an occupant's movement has not been sensed within a predetermined time, such as 30 minutes, controller 16 can be programmed to assume that the space is no longer occupied so that the target temperature will change from the occupant present target temperature, shown at occupant present display areas 52, to the occupant absent target temperature, shown at occupant absent display areas 54. If desired, in may be useful to change the length of time from 30 minutes, in this example, to a much longer period of time during the nighttime or during some other time when the occupant is expected to be sleeping. Another type of occupant presence detector is an active infrared detector to sense use of an infrared remote control device by an occupant. This would be particularly useful in rooms where such devices are commonly used when the room is occupied.

A further type of occupant presence detector includes an integrated sound detector to detect and process sound according to the amount, level and duration of the sound. This is accomplished by integrating the sound level over time. If the result is greater than a chosen threshold, occupant presence is assumed.

The occupant presence detector may also include an air pressure change detector to detect an air pressure change greater than a minimum air pressure change so to detect opening and/or closing of a door. In addition, the occupant presence detector may be located externally from the thermostat and include, for example, a user-actuated switch. For example, a switch may be located at or near a doorway so that an occupant can manually actuate a switch by hand when leaving or returning to a room. The switch may also be automatically actuated by, for example, the opening and/or closing of a door or by the occupant interrupting a light beam of a light beam switch upon exiting and entering a room. If more than one detector is used, the detectors external of thermostat 10 may be used in one or more rooms or other areas to be monitored.

Figure 2:
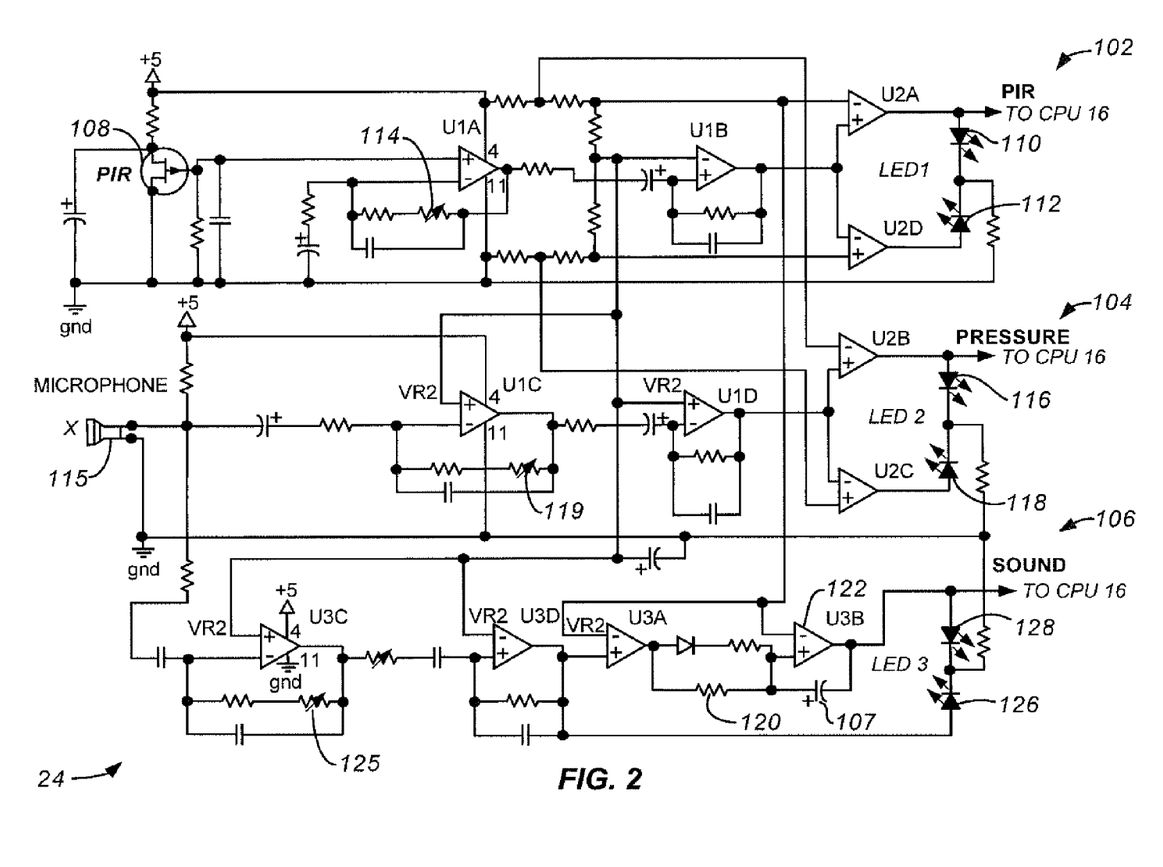
FIG. 2 is a circuit diagram of an occupant presence detector usable all with the thermostats of FIGS. 1 and 5.

An embodiment of the invention may use the occupant presence detector 24 illustrated in FIG. 2. Detector 24 includes a motion sensitivity portion 102, a pressure sensitivity portion 104 and a sound sensitivity portion 106. Motion sensitivity portion 102 comprises a passive infrared radiation (PIR) motion sensor 108 to sense heat in motion. LED's 110, 112 blink red/green/red/etc. when, for example, a person walks within the area of a sensitivity of motion sensor 108. Variable resistor 114 is user-settable to permit the user to set the motion sensitivity while monitoring LED's 110, 112. Portion 102 will provide an occupant present signal to CPU 16 when motion above a threshold minimum level has been sensed. CPU 16 will typically look for at least two detection cycles to indicate occupant presence.

Pressure sensitivity portion 104 is a very low frequency sound amplifier (under 1 Hz) used as an air pressure detector which detects when, for example, a door or window is opened or closed in a given area. Pressure sensitivity portion 104 uses a microphone 115 as the air pressure sensor. LED's 116, 118 blink red/green/red/etc. as pressure in an area is changed from, for example, opening (+) and closing (−) a door or window. Variable resistor 119 is user-settable to permit the user to set the pressure sensitivity while monitoring LED's 116, 118. Pressure sensitivity portion 104 can be quite sensitive; in one embodiment if detector 24 is within about 25 feet (7.6 m), at maximum sensitivity, pressure sensitivity portion 104 can detect someone pushing on a closed door. Portion 104 will provide a change in occupancy signal to CPU 16 when a pressure change above a threshold minimum level has been sensed. CPU 16 will typically look for at least 2 detection cycles to indicate occupant presence.

Sound sensitivity portion 106 is a mid frequency sound detector with a capacitor-type sound integrator 107 across operational amplifier 122 for detecting voices and other sounds of people occupancy. Sound integrator 107 integrates sound level over time so to filter out transient noises and thus eliminate false positives. Sound integrator 107 also is primarily sensitive to voices and/or other sounds of people occupancy. In one embodiment the range of sensitivity is taken to include the following frequency range: 500 to 5000 Hz (voice). There is no output of operational amplifier 122 until there is enough sound to charge capacitor sound integrator 107 over a trigger level. Once enough sound is detected, the output of operational amplifier 122 will go up and stay up as long as there is detectable sound. In one embodiment when there is no sound for about 2 seconds, the output of resistor 120 will go down and discharge capacitor-type sound integrator 107. This prevents single sound events from triggering the sound detector. A variable resistor 125 and a green LED 126 allows the user to set the sound sensitivity. A red LED 128 comes on when the sound has integrated to a detectable level. Portion 106 will provide an occupant present signal to CPU 16 when sound above a threshold minimum integrated sound level has been sensed. CPU 16 will typically look for one detection to indicate occupant presence. Portion 106 may also be used to indicate a change in occupancy.

Occupant presence detector 24 is typically a part of thermostat 10. However, more than one occupant presence detector 24 can be used. For example, an occupant presence detector 24 may be incorporated as a part of thermostat 10 and an additional, external occupant presence detector may be used to monitor, for example, different parts of the same room or different rooms. The external occupant presence detector which may have the same or different modes of detection as the occupant presence detector incorporated as a part of thermostat 10. In one embodiment an external occupant presence detector may be incorporated as a part of a light switch mounted to a wall of the building; such an occupant presence detector could be of a passive infrared detector type and be used to both automatically activate the switch, typically turning on lights, as well as provide an occupant present signal to controller 16. While the signal transmission between the remote occupant presence detector may be hardwired, it is presently preferred to use a wireless signal. One preferred method is to use an RF signal using the ZigBee protocol. The ZigBee protocol can also be used for connecting controller 16 to other remote devices, such as outdoor temperature sensor 26, heater/cooler 12, any external temperature sensors 22 and any remote control modules 28. In appropriate cases, a ZigBee repeater may be used to ensure a high-quality signal between the devices.

In some embodiments thermostat 10 may not include a clock but simply rely on sensing occupant presence or manual user input to control the temperature. In such embodiments remote control module 28 may be a clock-type remote control module 28 and may include, for example, a clock radio coupled to thermostat 10 through, for example, a ZigBee connection. Such a remote control module 28 may or may not include an occupant presence detector 24. In this way such a clock-less thermostat 10 may operate on both the basis of sensing occupants and on the basis of the time of day using operational signals from a clock-type remote control module 28.

Remotely Placeable Temperature Sensor Concept

Thermostat 10 may include not only a temperature sensor 22 in the user interface 14 but also a remotely placeable temperature sensor 22 could be placed in, for example, the bedroom of a house. Thermostat 10 can then be programmed to use the temperature from the temperature sensor 22 in the bedroom at night while using the temperature from the temperature sensor 22 in the user interface 14 during the day. More than one remotely placeable temperature sensors 22 could also be used. Also, on a more remotely placeable temperature sensors 22 could be used instead of a temperature sensor 22 in the user interface 14.

Thermostat Auto Mode Concept

One aspect of the invention allows thermostat 10 to be placed in an automatic mode (Auto Mode) to automatically switch between heating and cooling depending upon the target temperature in the heating mode, the target temperature in the cooling mode and the temperature in the room or other space being heated/cooled. This is done, unlike with conventional auto thermostats, without any limitation on the choice of the target temperatures for heating and cooling. Thermostat 10 is programmed so that when the temperature in the room goes below the lowest of the heating and cooling target temperatures by a first chosen amount, such as 3°, the system goes into the heating mode so that the furnace (or other heat source) is operated to heat the room. When the temperature in the room goes above the highest of the heating and cooling target temperatures by a second chosen amount, also typically 3°, the system goes into the cooling mode so that the air-conditioning unit (or other cooling source) operates to cool the room. Note that the first and second chosen amounts need not be the same. The first and second chosen amounts will typically be preprogrammed; however controller 16 can be programmed to allow them to be set or changed by a user. A thermostat using this Auto Mode Concept typically replaces the normal temperature swing with a small, one-sided swing equal to part of a degree, such as +0.4° from the target temperature during heating and −0.4° from the target temperature during cooling. The following three examples assume the first and second chosen amounts are each 3°.

For a first example, assume the heating target temperature is 72° and the cooling target temperature is 73°. When the temperature in the room goes below 69° the furnace is operated to heat the room until the room temperature reaches 72°. Assuming a one-sided swing of +0.4° for heating, the furnace is actuated when the temperature hits 69°, not 68.6°. The furnace turns off when the temperature reaches 72.4°. However, for simplicity in the following examples the swing will be ignored. When the temperature in the room goes above 76°, the air-conditioning unit is operated to cool the room until the new room temperature reaches 73°.

For a second example, assume the heating target temperature is 70° and a cooling target temperature is 70°, when the temperature in the room goes below 67° the furnace is operated to heat the room until the room temperature reaches 70°. When the temperature in the room goes above 73°, the air-conditioning unit is operated to cool the room until the room temperature reaches 70°.

For a third (unlikely) example, assume the heating target temperature is 72° and the cooling target temperature is 66°, when the temperature in the room goes below 63° the furnace is operated to heat the room until the room temperature reaches 72°. When the temperature in the room goes above 75°, the air-conditioning unit is operated to cool the room until the room temperature reaches 66°.

For a fourth, more typical, example, assume the first and second amounts are 2°, the heating target temperature is 70° and the cooling target temperature is 78°, when the temperature in the room goes below 68° the furnace is operated to heat the room until the room temperature reaches 70°. When the temperature in the room goes above 80°, the air-conditioning unit is operated to cool the room until the room temperature reaches 78°.

Thermostat 10 can also be programmed so that, for example, if there is an unusually warm, sunny day during the winter, which would otherwise cause the thermostat to go into the cooling mode, the user can override the automatic function and keep the system in a heating mode. For example, one way this could be accomplished is to program the thermostat so that if the user quickly switches from the auto mode to the heating mode and back to the auto mode, the thermostat would be instructed to stay in the heating mode until reset or for the next 24 hours (or some other appropriate period of time). A dedicated switch or input area may also be provided for this function.

Thermostat Auto Mode with Setback Concept

This aspect of the invention combines the Auto Mode Concept with the occupant present and occupant absent concept discussed above. With the Auto Mode with Setback Concept, the thermostat determines the apparent presence or absence of an occupant, or other user, using one or more sensing devices and methods, such as those described above. The thermostat is then placed in the occupant present or occupant absent mode as is appropriate.

If thermostat 10 is in an occupant present mode, then the system will function as discussed above. That is, thermostat 10 is programmed so that when the temperature in the room goes below the lowest of the heating and cooling target temperatures by a first chosen amount, the system goes into the heating mode so that the furnace (or other heat source) is operated to heat the room. When the temperature in the room goes above the highest of the heating and cooling target temperatures by a second chosen amount, the system goes into the cooling mode so that the air-conditioning unit (or other cooling source) operates to cool the room.

If thermostat 10 is in the occupant absent mode, then a cooling setback amount (such as 4°) is added to the cooling target temperature (such as 74°) and a heating setback amount (such as 8°) is subtracted from the heating target temperature (such as 70°) to arrive at a setback cooling target temperature (such as 78°) and a setback heating target temperature (such as 62°). Thermostat 10 is then placed in a heating mode when the sensed temperature is less than (or equal to) the setback heating target temperature. Thermostat 10 is then placed in a cooling mode when the sensed temperature is greater (or equal to) than the setback cooling target temperature. When an occupant is again sensed, thermostat 10 will return to operating in the occupant present mode.

For example, assume the cooling target temperatures and cooling setback amount (74° and 4°) and the heating target temperatures and heating setback amount (70° and 8°) are as discussed above. Thermostat 10 operates to keep the room in a house, or other space, at the heating target temperature when occupants are present. Assume the occupants leave the house that night. Thermostat 10 may be programmed so that one hour after the last detection of an occupant being present, the thermostat goes into an occupant absent mode. The heat setback amount is subtracted from the heating target temperature so that the heating unit will not turn on until the temperature in the room has dropped below 62°. Assuming it is a cold night and the temperature drops below 62°, the heating unit will come on to maintain the room at the setback heating target temperature, in this example 62°.

The next morning, the sun starts to heat the house and the room starts to heat up. When the room temperature, in this example, gets to 3° above the heating target temperature, that is above 73°, the thermostat transfers into a cooling mode. However, because no occupants have been detected, it stays in the occupant absent mode so that cooling will not begin until the temperature has reached 78°. As the sun begins to heat the house, the room temperature begins to increase. If it is a hot day and the room temperature reaches 78°, the cooling system will be actuated to maintain the setback cooling target temperature of 78°.

Assuming the system is still in an occupant absent mode because no occupants have been detected, as night falls the temperature drops in the room. When the temperature in the room gets to, in this example, 3° below the target cooling temperature, which is 71°, the thermostat transfers into a heating mode with 62° as the setback heating target temperature. Assuming this night is not as cold as cold as the prior night so that the room temperature only drops down to 65° before the morning when the room starts to again heat up from the outside. When in the Auto Mode with Setback, neither the heater nor the cooler is used when the room temperature is between, in this example, 62° and 78°. The temperature of the room rises and falls according to external heating and cooling when in such a range.

Whenever an occupant is a sensed, thermostat 10 returns to the occupant present mode so that the heating and cooling target temperatures of, in this example, 70° and 74° are once again used by the thermostat to control when to heat and when to cool the room.

Rate of Change of Temperature Concept

Another aspect of invention is the concept of using the rate of change of temperature to control which phase of a multiphase heater (for example, a single or 2 stage heat pump with an auxiliary electric heater or a two or three stage gas heater) would be used. The user could typically choose from a range of efficiencies from a low efficiency (quicker heating or quicker cooling) to a high efficiency (more gradual heating or more gradual cooling). The main reason for doing so is to increase efficiency consistent with acceptable levels of comfort. For example, in the South this feature might be used extensively using a high efficiency rate of change for heating while in the Midwest an intermediate efficiency rate of change for heating may be needed.

Figure 3:
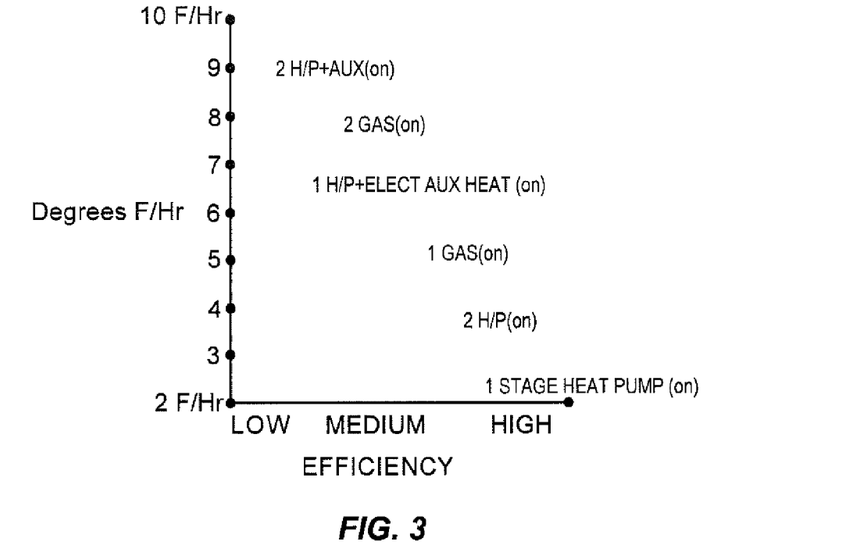
FIG. 3 is a graph illustrating the general concept that a higher rate of change of temperature generally corresponds to a lower efficiency.

The graph at FIG. 3 assumes an outside temperature of about 40° F. and a reasonably insulated house. Under these conditions, if a user with a two stage gas heater is happy with a 5° F. rate of rise, then setting the efficiency control at HIGH would save the user energy by not turning on the 2nd stage. Of course in warmer climates, the rate of rise could be much higher while not sacrificing higher efficiency.

If the heating efficiency setting is such that at least a 2nd stage comes on, we must assume the user wants the heat to come up faster so once the 2nd stage is on, it will bring the room temperature up all the way to target. From then on, the 1st stage should keep up. If not (like a heat pump in dead of winter), the rate of rise will be too slow or even negative so the 2nd stage will be turned on as soon as controller 16 sees the slow or negative rate of rise and if necessary, go to a third stage. The same function can be used for 2 stage cooling but using a rate of fall.

a user with just single state heating and/or cooling would not be affected by the efficiency control setting of the thermostat. It is only effective with at least 2 stages or sources of heating or cooling. The thermostat will detect if at least a 2nd stage is connected before indicating or using multi stage functions.

Sequential Staging System Concept

The Rate of Change Temperature Concept discussed above is designed with an emphasis on maximum efficiency when using multiple stage heating and cooling systems. However, the Sequential Staging System Concept discussed below is based upon the following premise: at least some of the time it is desired to bring the temperature to the target temperature at a reasonably rapid rate with a minimal regard to efficiency. After the target temperature has been reached, then the temperature can be maintained in a fuel-efficient way. The Sequential Staging System Concept is particularly useful when the system uses a setback concept, such as the one discussed above, so that the distance between the setback temperature and the target temperature can be quite large, such as 8 or 10°. However, the Sequential Staging System Concept can also be used when a setback concept is not used or is not active so that the heating or cooling system must only heat or cool a conditioned air region a conventional temperature swing of, for example, 3°.

According to this aspect of the invention the heating systems can be connected to thermostat 10 using mode A (the most common), mode B or mode C. Mode D applies to single stage and dual stage cooling systems. In the following description W1, W2 and W3 refer to the wires for the first, second and third stages of heat while Y1 and Y2 referred to the wires for the first and second cooling stages.

The connections for this embodiment of this concept include the following:

W1, W2, W3, HEAT Y1, Y2 COOL

If you have a single stage of heat, connect just W1, if you have two stages of heat connect W1 and W2, if you have three stages of heat connect all three, which are W1, W2 and W3.

Mode A applies to the following heating systems. Mode A provides the advantage of quickly heating up the conditioned space for maximum comfort and then returning to efficient temperature maintenance.

1 HEAT 1 stage heat pump, 1 stage electric furnace, 1 stage gas or oil furnace (W1 is 1st stage)

2 HEAT 2 stage electric, gas, or oil furnace (W1 is 1st stage, W2 is 2nd stage)

2 HEAT 2 stage heat pump (W1 is 1st stage pump, W2 is 2nd stage pump)

2 HEAT 1 stage pump and 1 stage electric auxiliary (aux) (W1 is 1 stage pump, W2 is 1 stage electric aux)

3 HEAT 3 stage electric, gas, or oil furnace (W1 is 1st stage, W2 is 2nd stage, W3 is 3rd stage)

3 HEAT 2 stage pump and 1 stage electric aux (W1 is 1st stage pump, W2 is 2nd stage pump, W3 is 1 stage aux)

3 HEAT 1 stage pump and 2 stage electric aux (W1 is 1 stage pump, W2 is 1st stage aux, W3 is 2nd stage aux)

When there are, for example, three heating stages, operation according to mode A proceeds according to the following steps.

1. The temperature of a conditioned air region is sensed by temperature sensor 22.
2. The first stage of the multistage heating system is operated when a sensed temperature moves below a target temperature (for example 70°) by a first amount (for example 3°).
3. Operation of the second stage begins after a first chosen time period (for example 1 minute) from the start of the first stage.
4. Operation of the third stage is begun after a second chosen time period (for example 1 minute) from the start of the second stage so that all three stages are operational.
5. If the target temperature is reached, operation of the first, second and third stages is halted.
6. Thereafter the first stage is operated to maintain the conditioned air region within a second amount (for example)3° of the target temperature.
7. However, if the temperature within the conditioned air region moves below the target temperature by a third amount (for example 4°), then the first and second stages are operated to maintain the conditioned air region within a fourth amount (for example)3° of the target temperature.
8. Thereafter if the temperature within the conditioned air region moves below the target temperature by a fifth amount (for example)4°, then the control returns to step 4 above with all three stages again being operated.

Appropriate modifications can be made when there are more than three stages.

When there are only two heating stages of the types discussed above, mode A and mode D (two cooling stages) operate in substantially the same way according to the following steps.

1. The temperature of a conditioned air region is determined by temperature sensor 22.
2. The operation of the first stage of the multistage air temperature control system is begun when a sensed temperature differs from a target temperature (for example 70° heating/78° cooling) by a first amount (for example) 3°.
3. The operation of the second stage of the multistage air temperature control system is begun after a chosen time period (for example 1 minute) from the start of the first stage so that both the first and second stages are operating to heat or cool the conditioned air region.
4. The operation of the first and second stages is stopped if the target temperature is reached.
5. Thereafter the first stage is operated to maintain the conditioned air region within a second amount (for example)3° of the target temperature.
6. However, if the temperature within the conditioned air region falls outside the target temperature by a third amount (4°), then control returns to step 3 so that both stages are again being operated.

Mode B is a specialized mode for this particular heating system. A specialized mode is used for this heating system because it is generally considered undesirable to have a heat pump and a fossil fuel furnace operating at the same time.

Two stage heat pump and 1 stage gas or oil aux heat (W1 is 1st stage pump, W2 is 2nd stage pump, W3 is aux).

Mode B operates according to the following steps to control the operation of the stages of a multistage heating system of the type including first, second and third stages, a heat pump comprising the first and second stages and an auxiliary heating source comprising the third stage.

1. The temperature of a conditioned air region is determined by a temperature sensor 22.
2. The operation of the third stage of the multistage heating system is begun when the sensed temperature drops below a target temperature (for example 70°) by a first amount (for example 3°).
3. The operation of the third stage is stopped if the target temperature is reached.
4. Thereafter the first stage is operated to maintain the conditioned air region within a second amount (for example 3°) of the target temperature.
5. If the temperature within the conditioned air region falls a third amount (for example 4°) below the target temperature, then the first and second stages are operated to maintain the conditioned air region within a fourth amount (for example 3°) of the target temperature.

6. If the temperature within the conditioned air region falls a fifth amount (for example 4°) below the target temperature, then operation of the first and second stages is stopped and control is returned to step 2 so that the third stage begins operating.

Mode C is a specialized mode for this particular heating system. A specialized mode is used for this heating system because as with Mode B heating systems, it is generally considered undesirable to have a heat pump and a fossil fuel furnace operating at the same time.

Single stage heat pump and dual stage gas or oil aux heat (W1 is 1 pump, W2 is $1^{st}$ stage gas/oil, W3 is $2^{nd}$ stage gas/oil).

Mode C operates according to the following steps to control the operation of the stages of a multistage heating system of the type including first, second and third stages, a heat pump comprising the first stage and an auxiliary heating source comprising the second and third stages.

The temperature of a conditioned air region is sensed by temperature sensor 22.

The operation of the second and third stages of the multistage heating system is started when a sensed temperature drops below a target temperature (for example 70°) by a first amount (for example 3°).

The operation of the second and third stage is stopped if the target temperature is reached.

Thereafter the first stage is operated to maintain the conditioned air region within a second amount (for example 3°) of the target temperature.

If the temperature within the conditioned air region falls a third amount (for example 4°) below the target temperature, then operation of the first stage is stopped and the second stage is operated to maintain the conditioned air region within a fourth amount (for example 3°) of the target temperature.

If the temperature within the conditioned air region falls below the target temperature by a fifth (for example 4°) amount, then the second and third stages are operated together to maintain the conditioned air region within a sixth amount (for example 2°) of the target temperature.

It is believed that providing for Mode A will accommodate all single stage heating and cooling systems and most multistage heating systems and most dual stage cooling systems. It is therefore preferred that thermostat 10 include at least provisions for Mode A, which inherently provides for Mode D. Although not usually critical, it is useful if thermostat 10 includes provisions for Modes B and C.

According to this aspect of the invention, connecting multistage heat sources to thermostat 10 simply involves connecting the appropriate wire to the appropriate terminal. The appropriate selection and use of the various stages is handled by thermostat 10 in an efficient manner.

Comfort Selection Concept

When using multiple stage heating (or cooling) systems, it is possible to have different temperature swings for the different stages. In one example the first of stage operates under a first stage temperature swing while the second and any additional stages operate under a second stage of temperature swing. In addition, the temperature swings can be selected to be different according to the comfort level desired. Typically a smaller temperature swing is considered less efficient because the heater (cooler) will cycle on and off more frequently than a larger temperature swing. However, in milder climates a smaller temperature swing may be able to be used without an unacceptable decrease in efficiency. This concept is applicable if the first stage stays on when the second stage comes on or if the first stage turns off when the second stage comes on. This concept is also applicable with systems having more than two stages.

The following example illustrates three temperature swing levels identified as a Comfort, Normal and Economy. At the Comfort temperature swing level, the first stage will keep the temperature+/−0.33 if it can. If the first stage cannot maintain the temperature within that swing range, the second stage will become operational when the temperature drops the 1°.

| Level | First Stage Temperature Swing | Second Stage Temperature Swing |
|---|---|---|
| Comfort: | .33° swing | 1° |
| Normal: | .66° swing | 2° |
| Economy: | 1.0° swing | 3° |

Self-Testing Back Plate Concept

Figure 4:
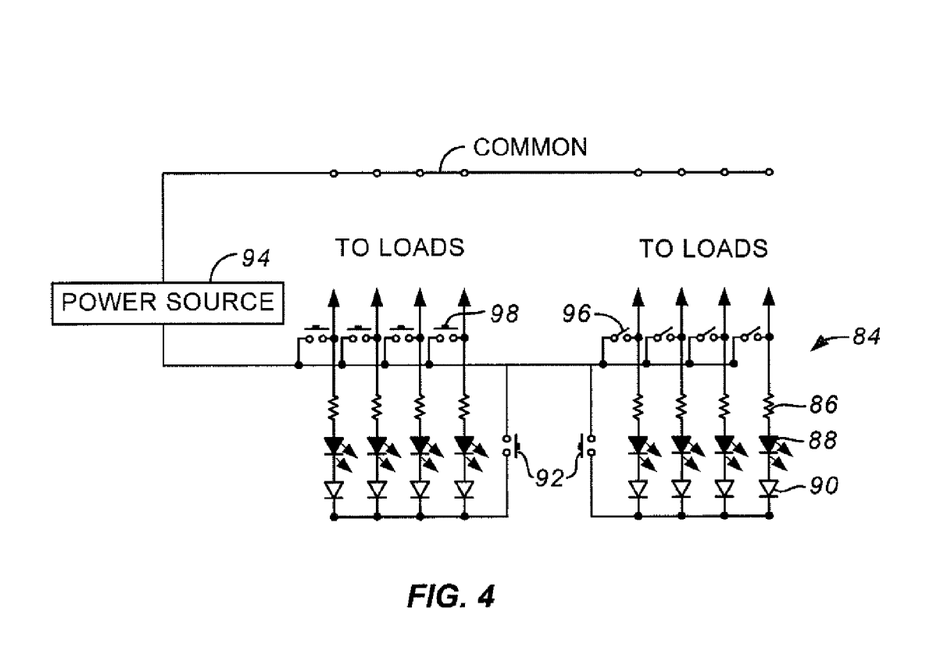
FIG. 4 is a simplified, generic version of test circuitry usable with the thermostat of FIG. 1.

FIG. 4 is a simplified, generic version of test circuitry that can be used with thermostat 10. The basic concept is to disconnect the load(s) (such as HVAC control relays associated with heater/cooler 12) from a controller, such as controller 16. This is typically accomplished by first opening or removing the back plate containing the test circuitry. Two simple tests, discussed below, are accomplished to determine if a perceived problem is a problem with the controller or with the load. The first step uses wiring test circuitry 84, including a current-limiting resistor 86, an LED 88 and a diode 90 for each load, and a wiring test button 92. Closing wiring test button 92 causes each LED 88 connected to its associated load to illuminate only if the load is properly connected to power source 94. If an LED 88 does not illuminate, there is a problem with the connection of power source 94 to its associated load. Therefore, this test shows that the load is getting power from power source 94. (The current-limiting resistor 86 sufficiently large to limit the amount of current supplied to the load to prevent actuation of the load during this first test.) Assuming the load is getting power from power source 94, the user proceeds to the second test. The second test is accomplished by actuating the function test switch/button 96, 98 of a second, test function circuit to "turn on" the load by connecting the load to power source 94; if the load does not operate as expected, the problem is with the load, not controller 16, because the load is properly connected to power source 94. If the load does operate as expected, then the perceived problem is with controller 16. This test circuitry can be particularly useful for troubleshooting a perceived problem with controller 16 during a telephone service call.

Alternative Thermostat Embodiment

Figure 5:
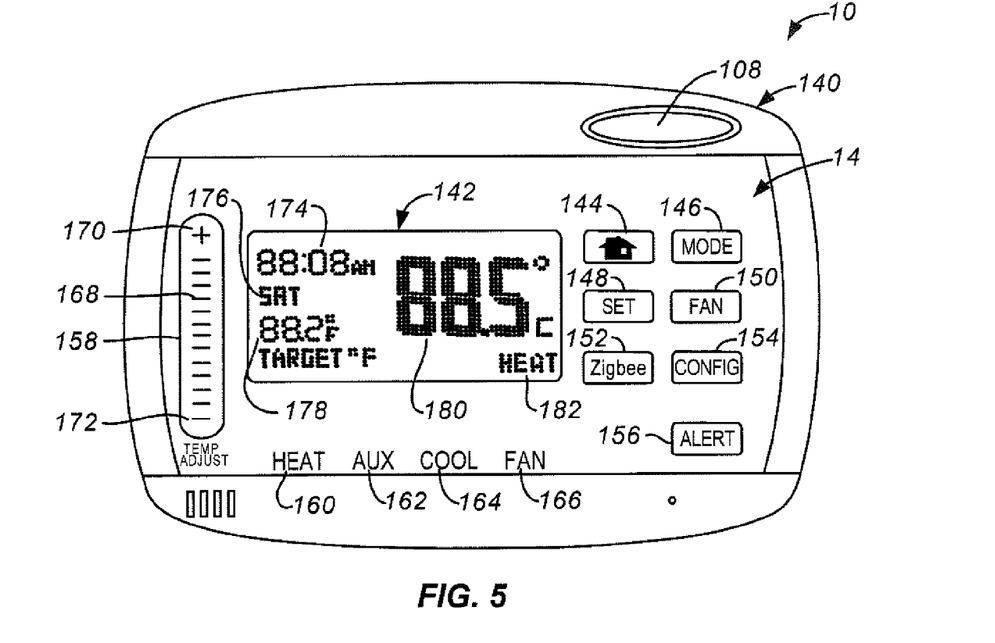
FIG. 5 is a front view of an alternative embodiment of the thermostat of FIG. 1.

FIG. 5 illustrates the front view of an alternative embodiment of thermostat 10 of FIG. 1 with like reference numerals referring to like elements. It will be seen that this embodiment includes various features and concepts discussed above as well as new features and concepts. Thermostat 10 includes a user interface 14 within a housing 140. User interface 14 includes an LCD display area 142 surrounded by various touch sensitive, backlit input areas. Input areas include a home area 144, a mode area 146, a set area 148, a fan area 150, a ZigBee area 152, a setup (or configuration) area 154, an alert area 156, and an adjustment area 158. Four backlit areas are used to identify the active status of the system, that is whether it is in a heat mode indicator 160, auxiliary mode indicator 162, cool mode indicator 164 and whether or not the fan is operational at fan indicator 166.

The embodiment of FIG. 5 preferably includes the occupant presence detector 24 of FIG. 2 with PIR motion detector 108 located at user interface 14 above home and mode areas 144, 146. The embodiment of FIG. 5 also preferably operates using the Thermostat Auto Mode with Setback Concept discussed above; the use of this concept in conjunction with using multiple thermostats 10 will be discussed below. The Self-Testing Back Plate Concept of FIG. 4 is used with the following variations. Test buttons 92 are not used. Also, pressing test buttons 98 not only illuminates a special, in this embodiment yellow, LED 88 adjacent to the corresponding indicator 160-166, it also activates the corresponding heater/cooler function and illuminates the corresponding indicator 160-166 with its corresponding color (orange, red, blue, or green).

Adjustment area 158 is used to raise or lower temperatures, as well as for other purposes. Adjustment area 158 includes a slider area 168 that is sensitive to the movement of the user's fingertip, or a stylus, up or down area 168. Adjustment area 158 also includes up area 170 and down area 172 to permit incremental, single digit changes by momentary contact with areas 170, 172. Continuous contact with areas 170, 172 for more than a chosen period, such as two seconds, causes the value to be continuously incrementally changed.

Display area 142 is shown in a typical display mode illustrating the time in time area 174, the day of the week at day area 176, the target temperature at target temperature area 178, the present temperature at temperature display area 180 and the operating mode, such as heat or cool, at operating mode area 182. Area 142 is capable of displaying other information during, for example, set up procedures.

Home area 144 is used to return interface 14 to a home state, such as shown in FIG. 5. ZigBee area 152 is used primarily when setting up the system according to the ZigBee wireless communication protocol. Further information on the ZigBee wireless communication protocol can be found at www.zigbee.org.

Set area 148 is used to set the heat and cool temperature setback amounts, set the life, such as 30 weeks, for the air filter, set the life for a humidity pad when a humidifier is used, set the humidification level when a humidifier is used, set the humidification level when a dehumidifier is used, and set the life for a UV lamp when a UV sanitizing system is used. In addition, the temperature swing may be changed from any factory-set swing, such as 0.75°. If heater/cooler 12 is cycling more often than is desired, the user can increase the swing to, for example, 1.5°. Therefore, if the target temperature for heating is 70°, the heater may turn on when the temperature goes below 68.5° and turn off when the temperature goes above 71.5°.

Mode area 146 is used to place thermostat 10 into or remove the thermostat from the Auto Mode with Setback state. Removing thermostat 10 from the Auto Mode with Setback state places the thermostat into the Auto Mode state, discussed above, so that information regarding the presence or absence of an occupant is ignored.

Fan area 150 is used to place the fan in an On mode, during which the fan operates continuously, an Auto mode, during which the fan operates only when the heater/cooler 12 is operating, or an Auto+Circulate mode. In the Auto+Circulate mode the fan is operated during heating or cooling cycles, as in the Auto mode, and also is periodically operated for a minimum set for length of time, such as 10 minutes each hour, regardless of the heating or cooling requirements. The length of time may be preset or may be chosen by the user, typically from a series or range of times, such as 5, 10 or 15 minutes every hour.

Figure 6:
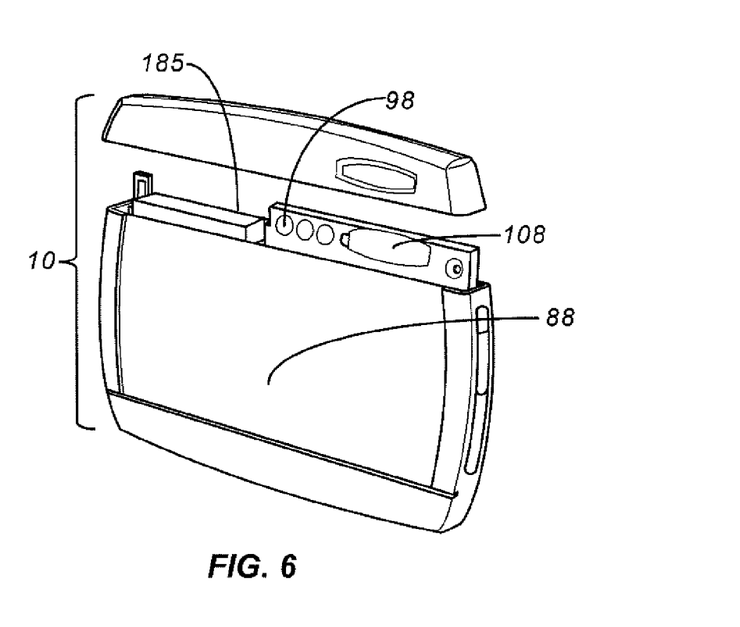
FIG. 6 is a partially exploded isometric view of the thermostat of FIG. 5 with a portion separated to show wire connections and test buttons.

Setup area 154 is used when thermostat 10 is initially connected to single and multiple stage heating and cooling systems. Instructions are given on display area 142 on how to connect the appropriate wires to the thermostat wire connections 185, shown in FIG. 6, according to the Sequential Staging System Concept discussed above. In addition, if an outdoor temperature sensor 26 is used, the user has the option of disabling any heat pump when the outdoor temperature is less than, for example, 40°. Also, when an outdoor temperature sensor 26 is used, thermostat 10 can accommodate an air-conditioning system having an external vent so that when the outside temperature is less than, for example, 65°, but the conditioned region needs to be cooled, the system can cool the conditioned region using outside air instead of running the compressor. Also, depending on the type of heating units, the user can select to have the thermostat control the fan (typical with electric heaters) or have the heater control the fan (typical with fossil fuel furnaces).

Figure 7:
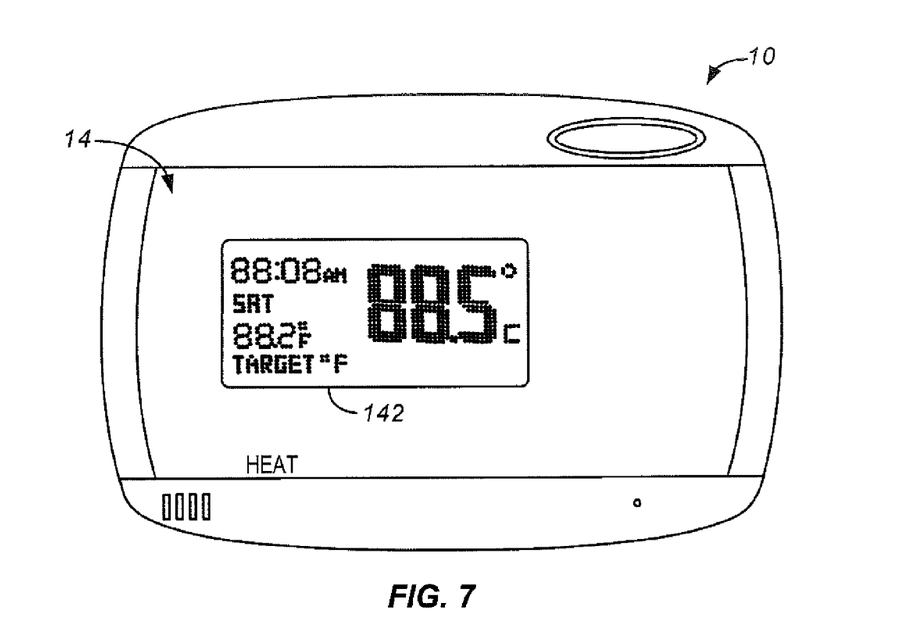
FIGS. 7 and 8 are front views of the thermostat of FIG. 5 shown in sleep and stealth modes.
Figure 8:
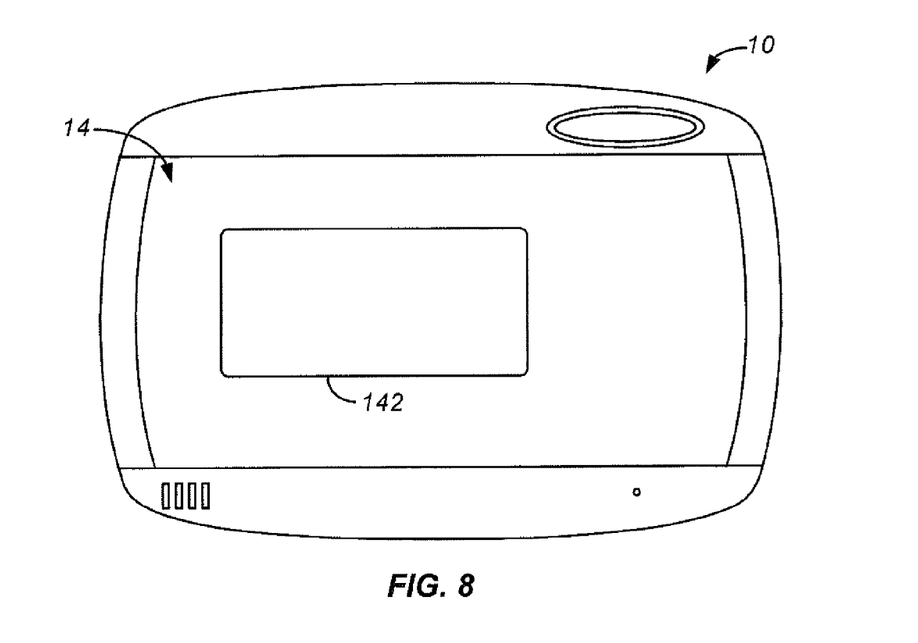

Set up area 154 is also used to determine what the user interface 14 will look like during periods of inactivity. FIG. 7 illustrates user interface 14 in what is called a sleep mode. The different areas and shown in FIG. 5 are typically illuminated using colored backlighting LED's. To produce the low visual impact sleep mode of FIG. 7, the colored LED's are turned off. However, display area 142 continues to display the temperature, etc. FIG. 8 illustrates user interface 14 in what is called a stealth mode. In this case display area 142 is also blank. The exception in both a sleep mode and the stealth mode is that if the heater is running, heat mode indicator 160 is illuminated. Touching user interface 14 when thermostat 10 is in either the sleep mode or the stealth mode causes the backlighting LED's to illuminate at partial brightness, for example 25%. Thereafter touching any particular area causes that particular function to be illuminated at full brightness.

Another feature of set up area 154 is that it permits the user to calibrate the temperature display to match, for example, the temperature reading of a thermometer in the same room. Assume, for example, temperature display area 180 displays a current temperature of 80°. Assume also that the user would like the display temperature to read 78°. This can be accomplished with set up area 154. Setup area 154 also allows the user to indicate whether or not a humidifier is used and whether or not a dehumidifier is used.

Alert area 156 is illuminated when thermostat 10 senses an alert status. Typical alerts include Low Battery when the battery should be replaced; Check Heater when the heater is activated but the room temperature drops, for example, 4° from the heat target temperature within, for example, 30 minutes; Check A/C when the cooler is activated but the room temperature increases, for example, 4° from the cool target temperature within, for example, 30 minutes. Other alerts include Check UV Lamp, Check Filter, Check Hum (Humidity) Pad, Check Alarm (when thermostat 10 is connected to an alarm system), and Check Water Timer (when thermostat 10 is connected to the water timer of an irrigation system). In addition, a ZigBee ID Conflict alert they be issued when a problem is sensed in the operation of the ZigBee wireless communication system.

Networked Thermostat Concept

Thermostat 10 of FIG. 5 can be used as a single unit or can be one of a network in a, for example, ZigBee mesh. More than one network can be on a ZigBee mesh like an upstairs HVAC network and a separate downstairs HVAC network. As discussed below, a network can also have zoned areas with ZigBee controlled baffles installed.

Figure 9:
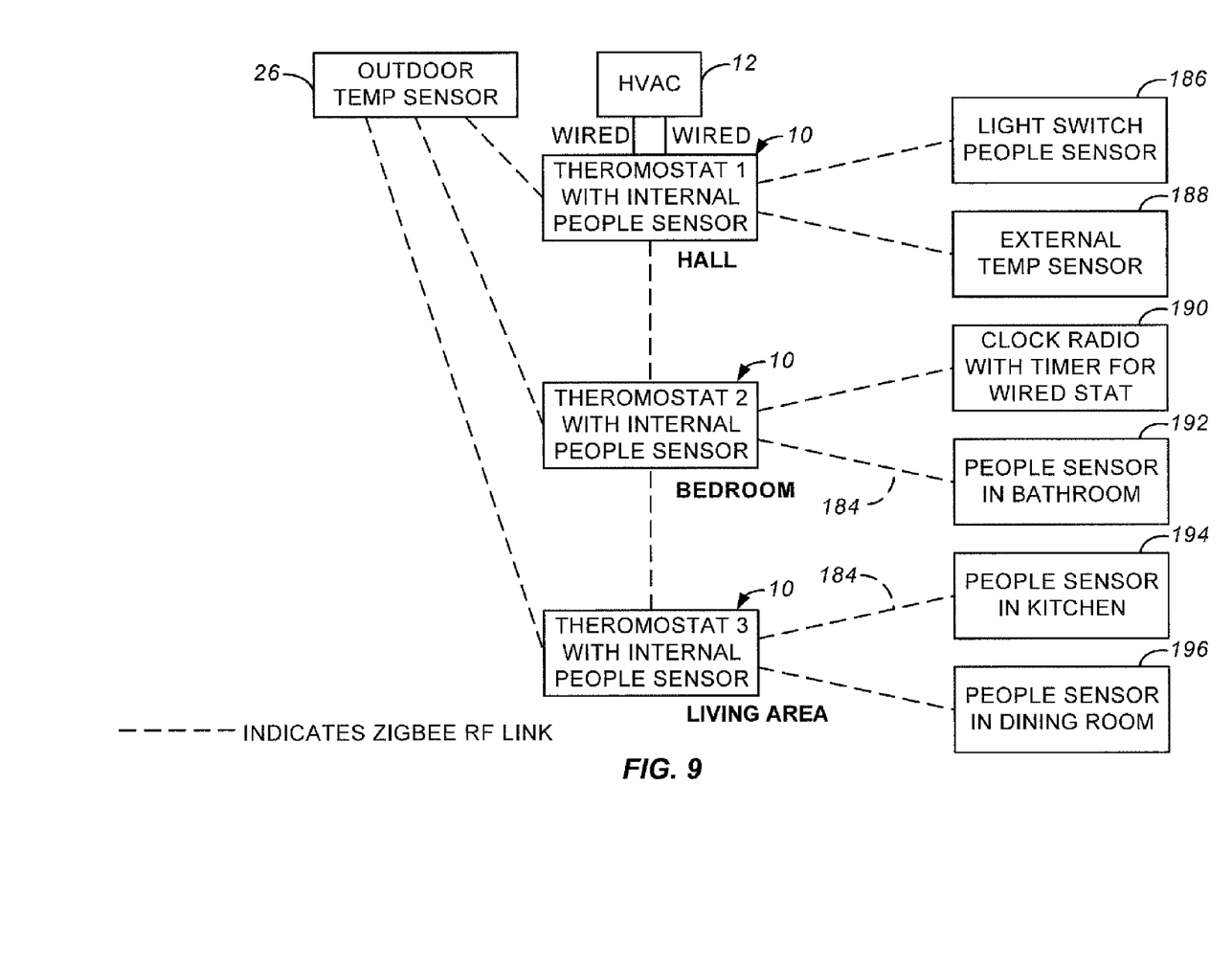
FIG. 9 shows a network of three of the thermostats of FIG. 5 coupled to one another and to external temperature sensors and other remote modules.

FIG. 9 is an example of a network of first and second and third thermostats 10 coupled together through ZigBee links 184, links 184 indicated in FIG. 9 as dashed lines. Each thermostat, in this embodiment, includes an occupant presence detector 24 of FIG. 2 to sense motion, pressure changes and sound; such detectors are also called people sensors. Each thermostat is also coupled to outdoor temperature sensor 26. First thermostat 10 is located in a hall and is coupled to a light switch people sensor 186 and an external temperature sensor 188. Second thermostat 10 is located in a bedroom and is coupled to a clock radio timer 190 and an external people sensor 192 located in a bathroom. Third thermostat 10 is located in a living area and is coupled to people sensors 194, 196 in a kitchen and in a dining room. Only first thermostat 10 is hardwired to the heater/cooler 12, identified as HVAC in FIG. 9. All thermostats 10 communicate with each other and the wired first thermostat 10 as required. The desired target temperature depends on occupancy of each separate area and the temperature settings of the associated thermostat 10.

Occupancy in an area is, in this embodiment, determined by at least 2 occupant present indications within 5 minutes from one or more occupant presence detectors (people sensors). If more than one area detects occupancy at the same time, the average of the target temperatures for each of the thermostats in the occupied areas will be used as the target temperature or for all of the areas; the average target temperature will be compared with the average of temperatures in the occupied areas. Target temperatures may be based on a value other than an average, such as a weighted average or a mean temperature. Also, the computation of the target temperature may change according to, for example, the time of day so that a bedroom target temperature may be given more weight at night than during the day.

For example, assume occupancy is detected in the region of the hall, the target temperature for the first thermostat set at 70°, and the sensed temperature being 71° so that the heat is not on. The bedroom detected no occupancy, the target temperature for the second thermostat is 72°, the sensed temperature is 69°; with no occupancy second thermostat 10 is in the setback mode so that the heat will not come on (that is heater/cooler 12 will not be used to heat the structure). However, if both areas become occupied, the target temperatures will be averaged so that the new target temperature is 71°. The average room temperature is 70° so that the heat will come on for the structure.

If there is no detection from any people sensor within 1 hour, the target temperature will be set back. The set back target temperature will be the set back target temperature of the thermostat that last detected occupancy. For example, assume the bedroom (second thermostat 10) detected occupancy last. When occupancy anywhere in the house is not detected for 1 hour, the heating setback amount for second thermostat 10 (−10°) will be used to create a setback heating target temperature of 62°.

Any of the first, second and third thermostats can be used to input settings for all the thermostats. All settings and changes to settings (except room temperature, heating and cooling target temperatures, and heating and cooling set back temperatures) on any thermostat will be implemented on all thermostats in the system via ZigBee communications. In this embodiment every thermostat 10 in the system is an equal. There is no master or controller thermostat. Each of the first, second and third thermostats 10 preferably have the necessary relays and other components so any thermostat can be wired to an HVAC system. Also, when any thermostat is in the heat mode, all thermostats will be in the heat mode.

Figure 10:
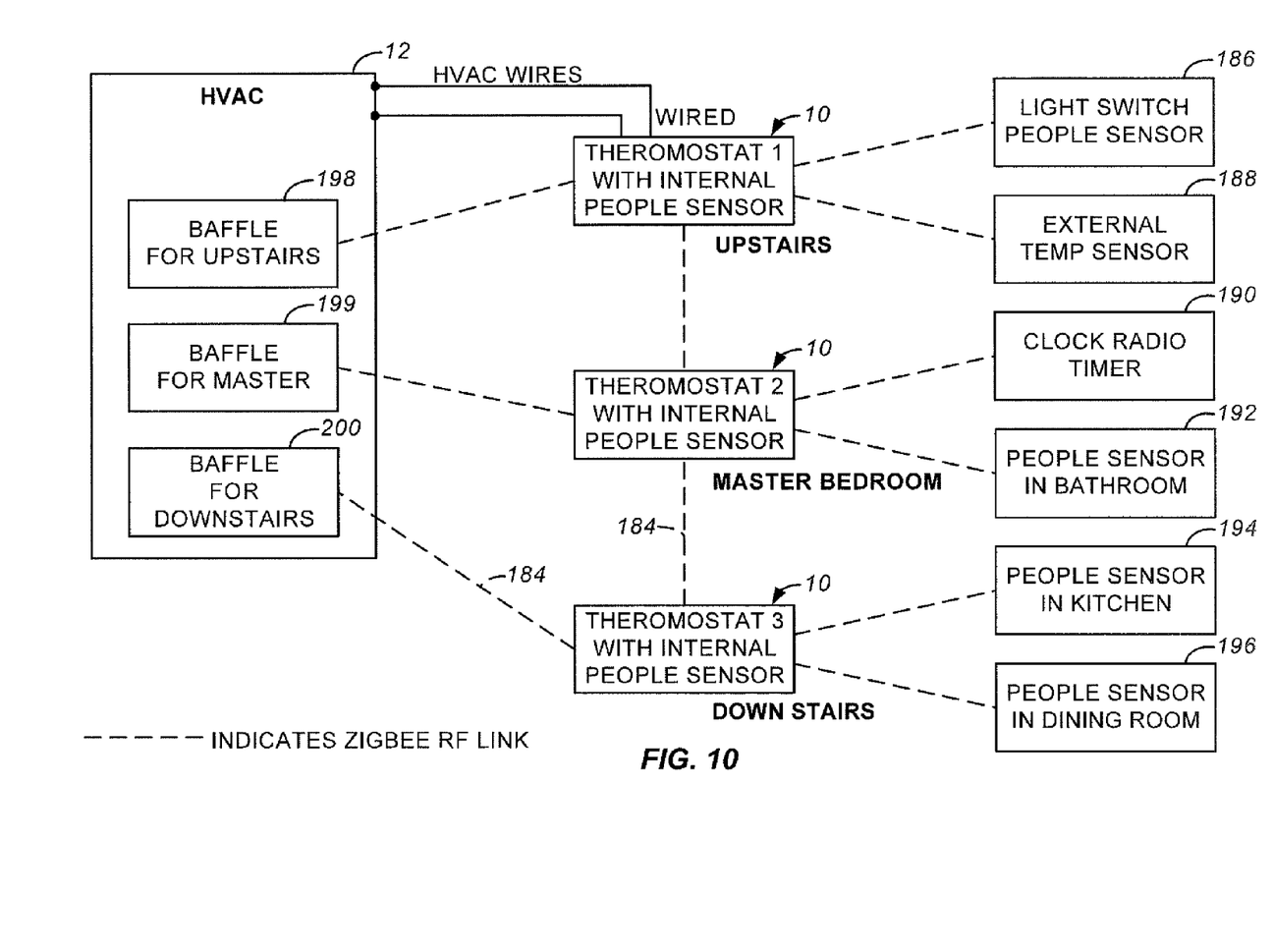
FIG. 10 shows a network of three thermostats similar to that of FIG. 9 connected to ductwork baffles for zoned heating and cooling.

FIG. 10 illustrates a network of first, second and third thermostats similar to the network of FIG. 9 with the following exception. Heater/cooler 12 includes a system of ductwork baffles including an upstairs baffle 198, a master bedroom baffle 199 and a downstairs baffle 200. Assume the following example. Occupancy in the master bedroom area is detected so that the master bedroom area requires heat. Second thermostat 10 sends a ZigBee command for heat to all the thermostats (first and third thermostats 10 in this example) on the network including the wired first thermostat 10. Second thermostat 10 also sends a command to open master bedroom baffle 199. Once the heating is finished, second thermostat 10 sends a signal to heater/cooler 12 to stop heating and closes baffle 199. If more than one room has occupancy, the average of each room's target temperature and room temperature will be used and heating will be decided on the basis of those averages. If, for example, first and second thermostats 10 both indicate that heating is needed, both upstairs baffle 198 and master bedroom baffle 199 will be opened during heating. Cooling follows a similar pattern. If one thermostat 10 requests heat and another thermostat 10 requests cooling at the same time, in one embodiment the area that requires heat takes priority. In this example each of the thermostats is shown controlling a single baffle. However, a thermostat can control more than one baffle. Also, the airflow to some regions may not be controlled by a baffle. The energy to power each baffle may be supplied by a hardwired connection, by batteries or by rechargeable batteries using, for example, the airflow through the air duct to power a miniature wind turbine.

An advantage of the networked baffle-type zoned system of FIG. 10 is that it does not require a separate controller wired to its associated baffle. This makes the installation much less expensive and facilitates retrofit installations.

One of the primary advantages of the embodiment of FIG. 5 is that it is not simply a thermostat but also incorporates an occupant presence detector (people sensor). A user can purchase a single thermostat and have an operational occupancy sensing thermostat. In addition, the same thermostat can be purchased along with external people sensors and other auxiliary devices, as exemplified by devices 186-196, for further functionality. In a retrofit installation, the existing thermostat connected to the heater/cooler is replaced and hardwired to a thermostat 10 made according to the invention, such as the embodiment of FIG. 5. Additional thermostats 10, along with external people sensors and other auxiliary devices, can be used without requiring any extensive wiring because of the use of wireless interconnections among the components.

Other modification and variation can be made to the disclosed embodiments without departing from the subject of the invention as defined in following claims.

Any and all patents, patent applications, and printed publications referred to above are incorporated by reference.

The invention claimed is:

1. A method for automatically switching between heating and cooling modes of a single thermostat, comprising:
    setting a heating target temperature for a single thermostat;
    setting a cooling target temperature for said thermostat;
    sensing the temperature within a conditioned region;
    placing the thermostat in a heating mode when the sensed temperature is less than the lowest of the heating and cooling target temperatures by a first amount with the heating target temperature being above, the same as or below the cooling target temperature;
    placing the thermostat in a cooling mode when the sensed temperature is greater than the highest of the heating and cooling target temperatures by a second amount with the cooling target temperature being above, the same as or below the heating target temperature;

maintaining the thermostat in the heating mode even when the sensed temperature becomes greater than the cooling target temperature when the cooling target temperature is less than the heating target temperature and the thermostat has entered the heating mode following operation during a cooling mode; and maintaining the thermostat in the cooling mode even when the sensed temperature becomes less than the heating target temperature when the cooling target temperature is less than heating target temperature and the thermostat has entered the cooling mode following operation during a heating mode.

2. A method for automatically switching between heating and cooling modes of a single thermostat, comprising:

setting a heating target temperature for a single thermostat;
setting a cooling target temperature for said thermostat;
sensing the temperature within a conditioned region;
determining the apparent presence or absence of a user;
placing the thermostat in a user present mode or a user absent mode based upon the result of the determining step;

if the thermostat is in a user present mode, then:
placing the thermostat in a heating mode when the sensed temperature is less than the lowest of the heating and cooling target temperatures by a first amount with the heating target temperature being above, the same as or below the cooling target temperature; and
placing the thermostat in a cooling mode when the sensed temperature is greater than the highest of the heating and cooling target temperatures by a second amount with the cooling target temperature being above, the same as or below the heating target temperature;

if the thermostat is in a user absent mode, then:
add a cooling setback amount to the cooling target temperature and subtract a heating setback amount from the heating target temperature to arrive at setback cooling and setback heating target temperatures, respectively;
placing the thermostat in a heating mode when the sensed temperature is less than the lowest of the heating and cooling target temperatures by a first amount with the heating target temperature being above, the same as or below the cooling target temperature; and
placing the thermostat in a cooling mode when the sensed temperature is greater than the highest of the heating and cooling target temperatures by a second amount with the cooling target temperature being above, the same as or below the heating target temperature;

maintaining the thermostat in the heating mode even when the sensed temperature becomes greater than the cooling target temperature when the cooling target temperature is less than the heating target temperature and the thermostat has entered the heating mode following operation during a cooling mode; and maintaining the thermostat in the cooling mode even when the sensed temperature becomes less than the heating target temperature when the cooling target temperature is less than heating target temperature and the thermostat has entered the cooling mode following operation during a heating mode.

3. The method according to claim 2 wherein the determining step comprises at least one of:
detecting use of an infrared remote control device;
determining a sound energy level by integrating sound level over time;
detecting an air pressure change greater than a minimum air pressure change; and
monitoring a user-actuated switch.

4. The method according to claim 2 wherein the determining step is carried out by:
sensing motion within a monitored region and providing an occupant present signal to a thermostat controller when motion above a threshold minimum level has been sensed;
detecting air pressure changes and providing a change in occupancy signal to the controller when an air pressure change above a threshold minimum level has been sensed; and
monitoring sound level and integrating the monitored sound level over time and providing an occupant present signal to the controller when sound above a threshold minimum integrated sound level has been sensed.

5. The method according to claim 1 wherein the first and second amounts are different amounts.

6. A method for automatically switching between heating and cooling modes of a single thermostat to control the operation of air heating and cooling units for a conditioned region, comprising:

setting a heating target temperature for a single thermostat;
setting a cooling target temperature for said thermostat;
sensing the temperature within a conditioned region;
placing the thermostat in a heating mode when the sensed temperature is less than the lowest of the heating and cooling target temperatures by a first amount with the heating target temperature being above, the same as or below the cooling target temperature, directing the air heating unit to maintain the temperature of the conditioned region within a heating temperature swing amount, and then ending the heating mode when the sensed temperature is greater than the heating target temperature by the heating temperature swing amount;
the thermostat being maintained in the heating mode even when the sensed temperature becomes greater than the cooling target temperature when the cooling target temperature is less than the heating target temperature and the thermostat has entered the heating mode following operation during a cooling mode;
placing the thermostat in a cooling mode when the sensed temperature is greater than the highest of the heating and cooling target temperatures by a second amount with the cooling target temperature being above, the same as or below the heating target temperature, directing the air cooling unit to maintain the temperature of the conditioned region within a cooling temperature swing amount, and then ending the cooling mode when the sensed temperature is less than the cooling target temperature by the cooling temperature swing amount; and
the thermostat being maintained in the cooling mode even when the sensed temperature becomes less than the heating target temperature when the cooling target temperature is less than heating target temperature and the thermostat has entered the cooling mode following operation during a heating mode.

* * * * *